Nov. 23, 1943.  C. G. STAELIN  2,335,135
MANUFACTURE OF FIBROUS GLASS
Filed April 29, 1940   2 Sheets-Sheet 1

INVENTOR
Carl Gustav Staelin

Nov. 23, 1943.  C. G. STAELIN  2,335,135
MANUFACTURE OF FIBROUS GLASS
Filed April 29, 1940  2 Sheets-Sheet 2

INVENTOR
Carl Gustav Staelin

Patented Nov. 23, 1943

2,335,135

UNITED STATES PATENT OFFICE 2,335,135

MANUFACTURE OF FIBROUS GLASS

Carl G. Staelin, Toledo, Ohio, assignor to Owens-Corning Fiberglas Corporation, a corporation of Delaware Application April 29, 1940, Serial No. 332,168

6 Claims. (Cl. 49—55)

The present invention relates to apparatus for reducing molten glass to fibers and more particularly to an improved metal bushing designed for such use.

The invention is designed as an improvement in metal bushings of the type shown and described in Patents No. 2,233,435 to Snow and No. 2,234,986 to Slaytor and Thomas, although the principles of the invention are applicable to other forms of glass melting crucibles, as for example the ordinary clay crucible, fore-hearth or tank.

Heretofore in the mechanical drawing of fine fibers from the outlet orifices of metal bushings of the type set forth above, the outlet orifices have been arranged in either a single row or in two parallel rows in close proximity to each other as shown in the earlier patent in order that the fibers issuing from the various orifices may be conveniently grouped together to produce a single strand. In order to effectively cool the molten glass and maintain proper resistance for satisfactory attenuation of the fibers, while at the same time preventing clogging of the bushing orifices by wetting of the metal surrounding the same with molten glass, the metal immediately surrounding each orifice has been in the form of a downwardly projecting nipple against which the air or other gaseous cooling medium issuing directly from, or induced by the action of, the opposed cooling blowers is adapted to impinge. Such air or gas serves to cool the nipple as well as the glass issuing therefrom and maintain the two at such relatively different temperatures that wetting of the outside regions of the nipple by the molten glass will not occur.

Where plural nipples are employed in a single or double row, it is essential that all of the nipples be cooled equally to insure uniform attenuation of fibers therefrom and prevent fibers of different diameters from being drawn from the various nipples. It is also desirable that each nipple be substantially uniformly cooled around its circumference.

The number of orifices or nipples which it has been possible to employ and maintain adequate and uniform cooling of all of them has heretofore been limited inasmuch as where more than two parallel rows of nipples have been contemplated, no provision has been made for cooling the inner row or rows. Furthermore, much for the same reason, no arrangement of nipples other than in parallel rows has been contemplated inasmuch as in any grouping of nipples in cluster form the nipples at the outer edges of the cluster would ordinarily shield the inner nipples in the cluster and adequate cooling of these latter nipples would not be attained.

The present invention is designed to overcome the above noted limitations that are attendant upon the arrangement and grouping of orifice nipples in metal bushings of this nature by providing, in a preferred form of the invention, a bushing having nipples that are arranged in multiple parallel rows consisting of two outer rows and one or more inner rows and having provision for adequately cooling the inner rows of nipples as well as the outer rows. In a modified form of the invention, a cluster of nipples is contemplated consisting of outer and inner nipples all of which may be equally and adequately cooled. By such an arrangement the number of outlet orifices from which fibers are attenuated may be materially increased while uniformity of fiber diameter in the grouped strand is preserved.

This being the principal object of the invention, other objects not at present enumerated will become apparent as the following description ensues.

I have found that by arranging the successive rows of nipples at varying levels, that is, projecting downwardly from downwardly converging planes or a converging surface such as a cone, it is possible to apply cooling gases to a multiplicity of individual rows of nipples substantially uniformly and thus vastly increase the production of the conventional bushings which have but two rows.

While being at different levels, all of the orifices are directed in one direction toward the common meeting point of the fibers for the production of the strand. That is, the orifice openings of each individual row lie in a plane, the planes of each row being spaced apart and perpendicular to the plane intersecting the said common meeting point, and/or substantially parallel to one another.

Figure 1:
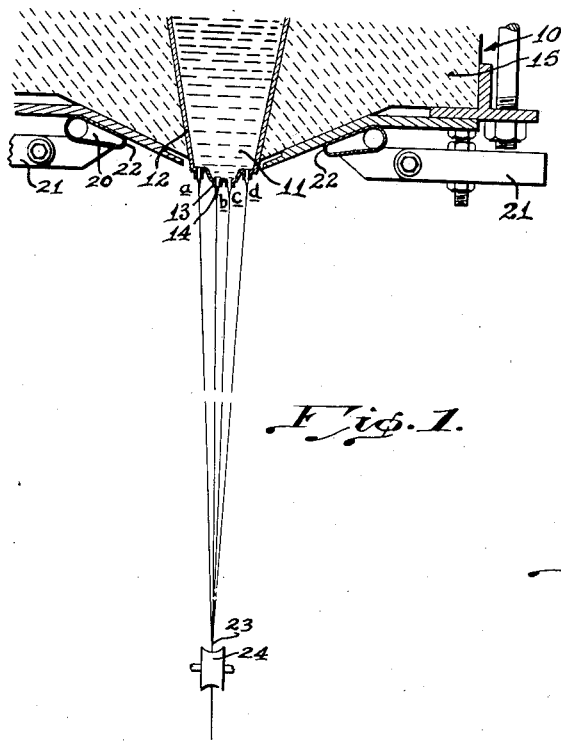
Fig. 1 is a diagrammatic transverse sectional view taken through a melting furnace with which one form of the improved metal bushing is incorporated.
Figures 2, 4:
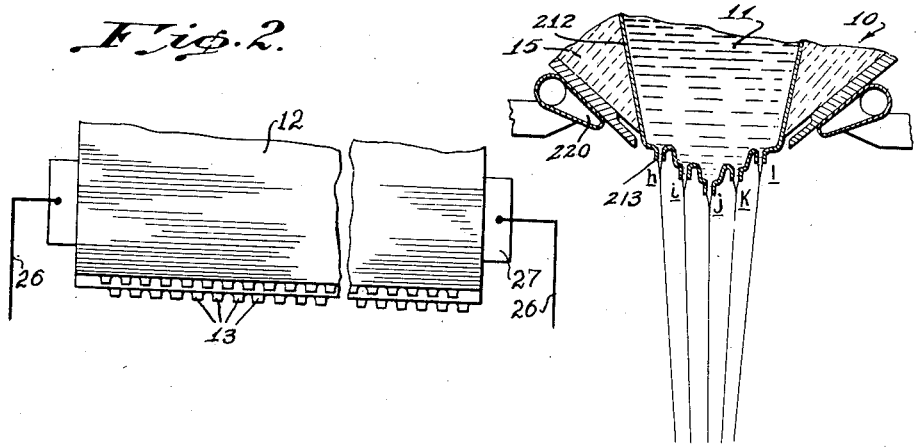
Fig. 2 is a side elevational view of the bushing shown in Fig. 1.
Fig. 4 is a sectional view similar to Figs. 1 and 3 showing another form of the bushing.

Referring to Figs. 1 and 2 a glass furnace or melting tank 10 is adapted to contain a supply body 11 of molten glass. In the floor of the furnace 10 is a metal bushing or thimble 12 which is provided with a series of nipples 13 through which the orifice openings 14 extend. The bushing 12 is composed preferably of a material which may be wetted by molten glass so as to expose definite amounts of the supply body through the orifice openings 14. High temperature refractory metals or alloys capable of withstanding temperatures above the devitrification point of glass such as platinum or platinum alloys are suitable for this purpose although nichrome steels and the like may also be used if glass temperatures are not too high. Around the bushing 12 is a refractory casing or support 15 capable of supporting and insulating the former. The nipples 13 project slightly below the body of the bushing 12 and also below the casing 15.

The nipples 13 are arranged in a plurality of rows, designated at a, b, c and d, four such rows being shown in the present instance. The two inner rows b and c are arranged at a materially lower elevation than the outer two rows a and d and the nipples of the two inner rows are staggered with respect to the nipples of the two outer rows as shown in Fig. 2. In this manner a multiplicity of orifices are provided which are more or less closely grouped together and occupy but slightly more space than the space usually alloted to a single row of nipples thus rendering a saving in fuel consumption while making an increase in production possible.

Spaced on opposite sides of the bushing 12 are the cooling means or blowers 20 which are adjustably held against the underneath side of the furnace 10 by means of supports 21. The blowers 20 are formed with jet openings 22 arranged to direct blasts of air, steam, or other cooling medium, inwardly and downwardly against the nipples 13 and glass fibers issuing therefrom to cool the same. Because of the fact that the nipples in the two inner rows are staggered with respect to the nipples in the two outer rows and also because the former nipples occupy an elevation slightly below that of the latter nipples, the gaseous blasts issuing from the blowers 20 will impinge upon all of the nipples from opposite sides and adequate cooling thereof and of the glass issuing therefrom will be effected.

The strands of glass issuing from the various nipples 13 are grouped together as at 23 and are passed over an eye or guide 24 which may be in the form of a roller or concave pad and are drawn thereover at a relatively high rate of speed by a suitable attenuating means (not shown) which may, if desired, be in the form of a winding drum of the type shown in either of the patents above cited.

Any suitable means may be employed for maintaining the supply body of glass in the bushing 12 at a temperature suitable for proper attenuation. The preferred method of heating the supply body and maintaining the same heated above the melting point of the glass and at suitable attenuating temperatures is shown in the earlier patent above cited in which the bushing itself is employed as a resistor and current is passed directly therethrough. For this purpose, any usual source of electric energy may be connected by means of conductors 26 to terminal lugs 27 at opposite ends of the bushing. Irrespective however of the particular method of heating the bushing or the glass contained therein, the essential features of the invention are at all times preserved.

Figure 3:
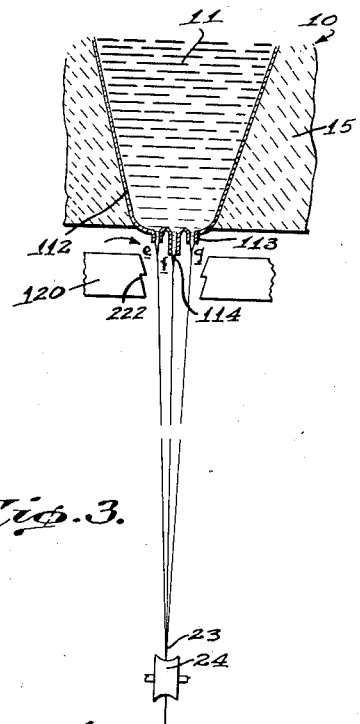
Fig. 3 is a sectional view similar to Fig. 1 showing another form of the bushing in use.

In Fig. 3 a modified form of bushing 112 is shown in which the various nipples 113 are arranged in three parallel rows e, f and g including two outer rows e and g and a single inner row f. The elevation of the nipples in the inner row f is below that of the nipples in the two outer rows and the former nipples are staggered with respect to the latter nipples to insure adequate and uniform cooling of all of the nipples from all sides thereof. The blowers 120 are spaced below the nipples 113 on opposite sides thereof and the orifice openings 222 thereof are directed inwardly and downwardly against the fibers issuing from the orifice openings 114 thus creating an induced draft of air, indicated by the arrow in this figure, which impinges against the nipples and fibers issuing therefrom and performs the cooling function.

The bushing 212 of Fig. 4 is similar in its construction to the bushings 12 and 112 previously described but a slightly different grouping of the nipples 213 is resorted to. In this form of the invention the nipples are arranged in five parallel rows h, i, j, k and l with the rows progressing inwardly being arranged at successively lower elevations and with the nipples of adjacent rows being staggered. The reduction in elevation of the nipples of each succeeding row inwardly is substantially equal in order that the cooling medium may pass across the various rows successively and impinge upon the nipples thereof. In this form of the invention an arrangement of blowers 220 similar to the blowers 20 for causing the cooling medium to impinge directly upon the blowers is employed.

Figure 5:
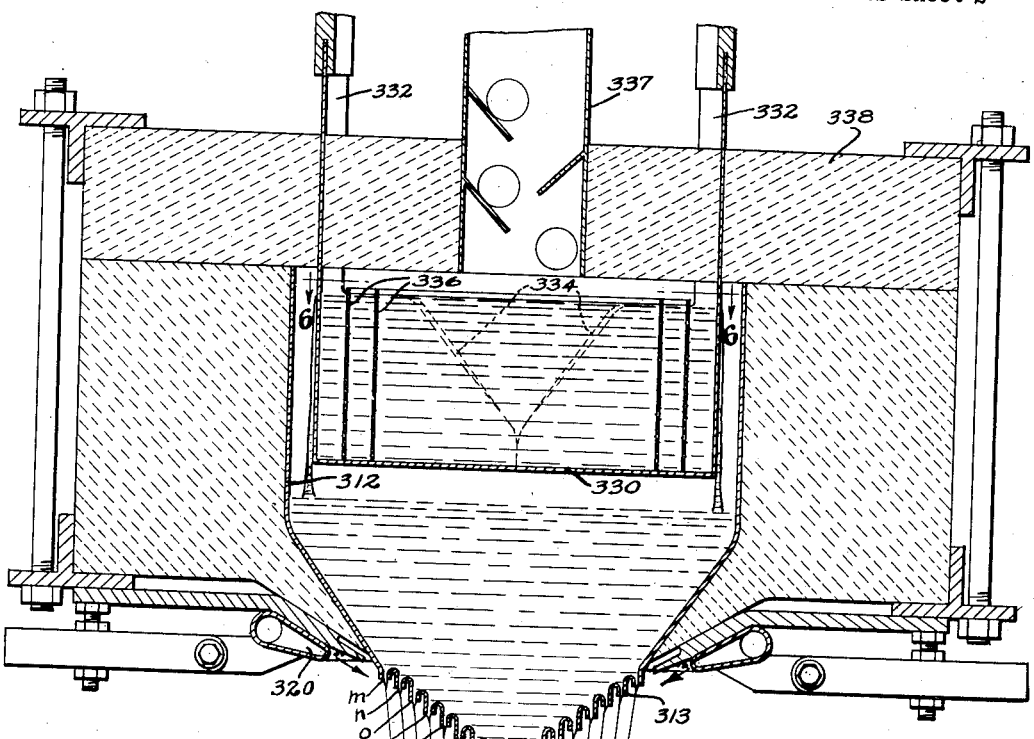
Fig. 5 is a sectional view similar to Figs. 1, 3 and 4 showing yet another form of bushing.
Figure 6:
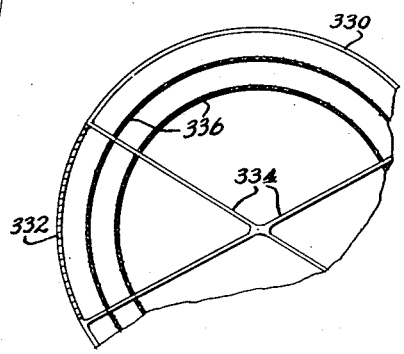
Fig. 6 is a fragmentary sectional view taken substantially along the line 6—6 of Fig. 5.
Figure 7:
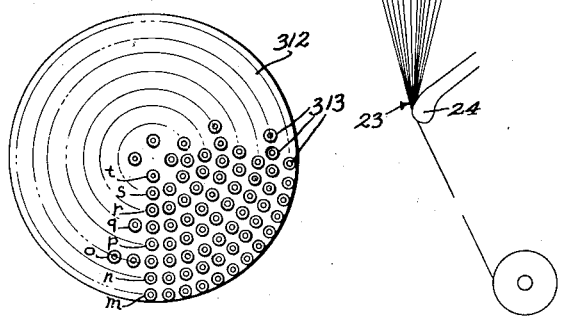
Fig. 7 is a bottom plan view of the bushing per se shown in Fig. 5.

In Figs. 5, 6 and 7, the bushing 312 is of circular contour and is substantially conical in shape. The nipples 313 are arranged in concentric fashion with an outer series m arranged in circular fashion and inner circular series ranging consecutively from n to t at successively lower elevations. The nipples of adjacent series are staggered, insofar as practicable, and a circular blower 320 surrounds the nipples and is spaced below the bushing 312 in such a manner that jets of air as indicated by the arrows are directed against the nipples inwardly to perform the cooling function thereon and upon the fibers issuing therefrom. The jets of the gaseous cooling medium are directed radially inwardly and downwardly at an angle to the horizontal somewhat less than the angle of inclination of the converging walls of the bushing 312 and thus the cooling medium is deflected downwardly by these walls and passes between adjacent nipples of the outer series m first and thence between the adjacent and staggered nipples of the remaining series.

It is obvious that instead of directing the cooling medium so as to impinge directly upon the nipples, a cooling system utilizing induced air similar in principle to that shown in Fig. 3 may be employed if desired.

While it is possible to utilize a bushing 312 itself as a resistor in the manner shown in the earlier British patent in order to maintain the glass at a temperature sufficiently high to permit attenuation, it is preferable with a bushing of circular design to utilize a heating means whereby the glass may be more uniformly heated. Particularly where the cullet, as for example the type of cullet consisting of marbles as shown in the later patent, is introduced into the bushing at the central regions thereof it is necessary to concentrate a large amount of heat centrally of the bushing to quickly melt the marbles and bring the entire mass of glass to attenuating temperatures. Accordingly, referring to Figs. 5 and 6, a resistor in the form of a circular vessel 330 having an open top is suspended in the bushing 312 above the level of glass therein and is spaced from the walls thereof. The vessel 330 is suspended by means of a pair of electrical connectors 332 which are connected to the vessel at diametrically opposed points. A pair of diametrical webs 334 extend across the bushing 312 at an acute angle to each other as shown in Fig. 6 and intersect at the center of the vessel in order to bring this region of the vessel to a relatively high heat. The height of each web 334 decreases toward the center of the vessel as shown by the dotted lines in Fig. 5.

A plurality of vertically extending concentric screens 336 extend from the bottom of the vessel upwardly above the upper edge or rim of the latter to screen the molten glass as it passes outwardly from the central region of the same toward the rim thereof. The marbles or other cullet are introduced through a chute or funnel 337 to the central regions of the bushing 312 and are melted and the molten glass passes outwardly through the screens 336 and flows over the upper rim of the vessel whence it flows by gravity in the form of a cylindrical sheet downwardly into the bushing 312 and is thus fined. The chute 337 passes downwardly through a cover plate 338 for the bushing 312.

The vessel 330 including the webs 334, connectors 332, and screens 336 are preferably formed of platinum or platinum alloy in order to increase the life thereof.

The invention is not to be limited to the exact groupings of the nipples shown in the various illustrations made herein inasmuch as the essential features of the invention may be preserved with other groupings. For example, while in the drawings bushings having three, four and five parallel rows of nipples are illustrated, the number of rows employed may be increased to within limits of practicability. Likewise, while in Figs. 5 and 6 a cluster of nipples arranged in concentric staggered fashion at different elevations is shown, the nipples of such a cluster may be arranged at different elevations and in staggered fashion without resorting to strict circular arrangement thereof.

Furthermore, because the various rows of series of nipples are arranged at different elevations, the cooling means may be dispensed with entirely and normal radiation of heat from the nipples may be relied upon as the sole cooling medium.

Modifications and variations may be resorted to within the spirit and scope of the invention as defined in the claims.

I claim:

1. Apparatus for attenuating fibers from molten glass comprising a metal receptacle adapted to contain a supply body of molten glass, a plurality of nipples protruding downwardly from the bottom wall of said receptacle, said nipples being arranged in a plurality of rows, a passage through each of said nipples opening through the bottom end surface of each nipple to form an orifice in said end surface from which the molten glass in the receptacle flows in a small stream, the orifices in different rows of nipples being at different elevations, and the bottom end surfaces of all of said nipples being located each to define a horizontal plane.

2. Apparatus for attenuating fibers from molten glass comprising a metal receptacle adapted to contain a supply body of molten glass, means for heating said receptacle, a plurality of nipples protruding downwardly from the bottom wall of said receptacle, said nipples being arranged in a plurality of rows, a passage through each of said nipples opening through the bottom end surface of each nipple to form an orifice in said end surface from which the molten glass in the receptacle flows in a small stream, the orifices in different rows of nipples being at different elevations with the elevation of the orifices decreasing successively toward the center line of said receptacle, and the bottom end surfaces of all of said nipples being located each to define a horizontal plane.

3. Apparatus for attenuating fibers from molten glass comprising a metal receptacle adapted to contain a supply body of molten glass, means for heating said receptacle, a plurality of nipples protruding downwardly from the bottom wall of said receptacle, said nipples being arranged in a plurality of rows, a passage through each of said nipples extending in a vertical direction and opening through the bottom end surface of each nipple to form an orifice in said end surface from which the molten glass in the receptacle flows in a small stream, the orifices in different rows of nipples being at different elevations with the elevation of the orifices decreasing successively toward the center line of said receptacle, and the bottom end surfaces of all of said nipples being located each to define a horizontal plane.

4. Apparatus for attenuating fibers from molten glass comprising a metal receptacle adapted to contain a supply body of molten glass, means for heating said receptacle, a plurality of nipples protruding downwardly from the bottom wall of said receptacle, said nipples being arranged in a plurality of concentric circular series, a passage through each of said nipples opening through the bottom end surface of each nipple to form an orifice in said end surface from which the molten glass in the receptacle flows in a small stream, the orifices in different series of nipples being at different elevations with the elevation of the orifices decreasing successively toward the center line of said receptacle, and the bottom end surfaces of all of said nipples being located each to define a horizontal plane.

5. Apparatus for attenuating fibers from molten glass comprising a metal receptacle adapted to contain a supply body of molten glass, means for heating said receptacle, a plurality of nipples protruding downwardly from the bottom wall of said receptacle, said nipples being arranged in a plurality of rows, a passage through each of said nipples opening through the bottom end surface of each nipple to form an orifice in said end surface from which the molten glass in the receptacle flows in a small stream, the orifices in different rows of nipples being at different elevations with the elevation of the orifices decreasing successively toward the center line of said receptacle, the bottom end surfaces of all of said nipples being located each to define a horizontal plane, and means for directing a current of cooling gas over all of said nipples.

6. Apparatus for attenuating fibers from molten glass comprising a metal receptacle adapted to contain a supply body of molten glass, a plurality of nipples protruding downwardly from the bottom wall of said receptacle, said nipples being arranged in a plurality of rows, a passage through each of said nipples opening through the bottom end surface of each nipple to form an orifice in said end surface from which the molten glass in the receptacle flows in a small stream, one of said rows being disposed in the central vertical plane of said receptacle and the other rows being arranged symmetrically at opposite sides of said central row, the orifices in different rows of nipples being at different elevations with the orifices of said central row being at the lowest elevation and the orifices of the other rows increasing progressively outwardly from said central row, and the bottom end surfaces of all of said nipples being located each to define a horizontal plane.

CARL G. STAELIN.